United States Patent Office 3,376,315
Patented Apr. 2, 1968

3,376,315
UNSATURATED ETHERS OF DIOXANES AND DIOXOLANES
Joanne Denise Burger and William L. Howard, Lake Jackson, Tex., assignors to The Dow Chemical Company, Midland, Mich., a corporation of Delaware
No Drawing. Original application July 3, 1963, Ser. No. 292,718, now Patent No. 3,290,388, dated Dec. 6, 1966. Divided and this application July 11, 1966, Ser. No. 571,676
3 Claims. (Cl. 260—340.9)

This is a division of our copending application Ser. No. 292,718, filed July 3, 1963, now Patent No. 3,290,388.

This invention is concerned with new chemical compounds. More specifically, it is concerned with new unsaturated aliphatic ethers of glycerol and their derivatives.

These new compounds may be separated into two main sub-groups, the monopropynyl ethers of glycerol, and the lower aliphatic cyclic acetals and ketals of these monoethers. Representative of the first group are 3-(2-propynyloxy) - 1,2-propanediol and 2-(2-propynyloxy)-1,2-propanediol. Included in the second group are 1,3-dioxolanes and m-dioxanes having one of the formulas:

(1)
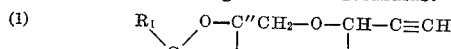

(2)
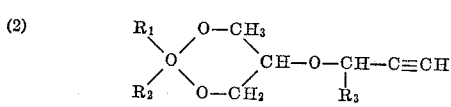

where $R_1$, $R_2$, and $R_3$ are a hydrogen atom or a lower alkyl radical such as methyl, ethyl, propyl, or butyl. Also included are allyl ethers of m-dioxanes, which compounds have the formula:

(3)
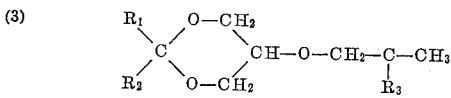

wherein $R_1$, $R_2$, and $R_3$ are as defined above.

The ethers represented by Formulas 1, 2, and 3 above are preferably made by reacting the sodium or potassium salt of the corresponding dioxolanemethanol or dioxanol with an unsaturated halide such as propargyl iodide, 3-bromo-1-pentyne, or methallyl chloride. The alkali metal salt can be prepared by conventional means for making such salts. A convenient method involves the reaction of the alcohol with an alkali metal hydride. The 1,3-dioxolanic and 4-m-dioxanol intermediates are made conveniently in most cases by the reaction of an aldehyde or a ketone with glycerol. The 2,2-dialkyl-5-m-dioxanols offer some difficulty in their preparation and special methods of synthesis are often necessary (see Carter, Berichte, 63B, 2399 (1930)).

Conventional hydrolysis or alcoholysis of the above propynyloxy dioxolanes and dioxanes in the presence of an acid catalyst converts these compounds to the corresponding monopropynyl ether of glycerol, i.e., ethers having one of the formulas

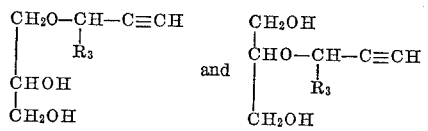

where $R_3$ is as previously defined. Good yields are obtained by refluxing these cyclic ketals and acetals with methanol in the presence of a mineral acid such as hydrochloric acid or sulfuric acid and distilling off the dimethyl acetal or ketal as its methanol azeotrope as the reaction proceeds.

These compounds can also be made by other known methods. For example, glycerol monoethers are obtained by the reaction of a propynyl alcohol with glycidol in the presence of boron trifluoride and they may also be prepared by reacting glycerol with a propynyl halide in the presence of a base. Both of these reactions, however, yield a mixture containing 2-(2-propynyloxy)-1,3-propanediol and 3-(2-propynyloxy)-1,2-propanediol. These propynyloxypropanediols are converted to the cyclic acetals or ketals represented by Formulas 1 and 2 above by heating with an aliphatic aldehyde or ketone in the presence of an acid or acidic salt.

The preparation by preferred methods of several compounds representative of the classes described above is shown in the following examples.

EXAMPLE 1

To a solution of 15.1 g. moles of 2,2-dimethyl-1,3-dioxolane-4-methanol in toluene there was added in small portions at room temperature 185 g. of a mineral oil suspension containing 4.2 g.-moles of sodium hydride. After gas evolution had ceased, 4.0 g.-moles of 3-bromopropyne was added to the stirred reaction mixture. The resulting mixture was then partitioned between water and toluene and the toluene layer was distilled under reduced pressure to obtain an 81% yield of 2,2-dimethyl-4-(2-propynyloxymethyl)-1,3-dioxolane based on the 3-bromopropyne used. The product was a colorless liquid, B.P. 78° C./6 mm., $n_D^{23}$ 1.4411. Analysis confirmed the structure of the product as named and showed it to be of about 98% purity.

EXAMPLE 2

A solution of 3.24 g.-moles of 2,2-dimethyl-4-(2-propynyloxymethyl)-1,3-dioxolane in methanol was acidified by addition to it of 5 ml. of conc. HCl. The mixture was then distilled while additional methanol was added to it as needed to form the acetone dimethyl acetal-methanol azeotrope which was distilling off. The acid residue was neutralized and distilled under reduced pressure to obtain 83% of the theoretical quantity of 3-(2-propynyloxy)-1,2-propanediol based on the starting dioxolane. The product was a colorless liquid, B.P. 114° C./1 mm., $n_D^{23}$ 1.4747. Analysis revealed this product to be of better than 98% purity.

EXAMPLE 3

By the procedure of Example 1, the sodium salt of 2-methyl-5-m-dioxanol was prepared by reaction with sodium hydride and the sodium salt was reacted with 3-bromopropyne to obtain 2-methyl-5-(2-propynyloxy)-m-dioxane. This product was a colorless liquid of relatively high boiling point.

EXAMPLE 4

2 - methyl-5-(2-propynyloxy)-m-dioxane was acidified with HCl in methanol solution and converted to 2-(2-propynyloxy)-1,3-propanediol by the general procedure shown in Example 2. The product was a colorless liquid with properties closely similar to those of the corresponding 3-propynyloxy compound.

EXAMPLE 5

As shown in Example 1, the sodium salt of 2-methyl-1,3-dioxolane-4-methanol was prepared and reacted with 3-bromopropyne to produce 2-methyl-4-(2-propynyloxymethyl)-1,3-dioxolane, a liquid closely resembling the dimethyl homolog product of Example 1. Treatment of this compound with methanol and acid also forms the 3-(2-propynyloxy)-1,2-propanediol as described in Example 2.

EXAMPLE 6

The sodium salt of 2-methyl-5-m-dioxanol was reacted with allyl chloride by the procedure of Example 1 to make 5-allylloxy-2-methyl-m-dioxane. This compound was a colorless liquid, B.P. 111° C./29 mm., $n_D^{23}$ 1.4518.

By the methods described above, other unsaturated ethers of 1,3-dioxolane-4-methanol and 5-m-dioxanol of the general formulas shown above are prepared. For example, 3-bromopropyne is reacted with the sodium salt of 2-propyl-1,3-dioxolane-4-methanol to obtain 2-propyl-4-(2-propynyloxymethyl)-1,3-dioxolane, 3-chloropropyne is reacted with the sodium salt of 2-ethyl-2-methyl-5-m-dioxanol to make 2-ethyl-2-methyl-5-(2-propynyloxy)-m-dioxane, 3-bromo-1-butyne is reacted with the potassium salt of 2-butyl-5-m-dioxanol to make 2-butyl-5-(1-methyl-2-propynyloxy)-m-dioxane, and 3-chloro-1-hexyne is reacted with the sodium salt of 2-ethyl-2-methyl-1,3-dioxolane-4-methanol to obtain 2-ethyl-2-methyl-4-(1-propyl-2-propynyloxymethyl)-1,3-dioxolane. Compounds such as 4-(2-propynyloxymethyl)-1,3-dioxolane, 2-ethyl-4-(1-methyl-2-propynyloxymethyl)-1,3-dioxolane, 2-methyl-5-methallyloxy-m-dioxane, 2-butyl-5-ethallyloxy-m-dioxane, 2,2-dimethyl-5-allyloxy-m-dioxane and 5-(2-propynyloxy)-m-dioxane are similarly prepared. By acid-catalyzed hydrolysis or alcoholysis, the above-named dioxolanes and dioxanes are converted to the corresponding unsaturated monoethers of glycerol. All of these compounds, when pure, are colorless liquids with properties closely resembling those of the related compounds shown in the above examples.

The compounds of this invention are useful chiefly for their biological activity. The propynyl monoethers of glycerol are effective for the control of parasitic trichostrongylid and ascarid worms when these compounds are incorporated into the diet of infected animals in concentrations of the order of 0.05–0.1% by weight. These propynyloxypropanediols are also useful for combating unwanted fish life, offering 100% control when present in water in concentrations as low as two parts per million, and are effective insecticides when applied to aphids and similar insects as aqueous dispersions.

4-(2-propynyloxymethyl)-1,3-dioxolanes of the generic formula shown above have biological characteristics similar to those of the propynyl monoethers of glycerol and they are particularly effective in the control of parasitic worms such as named. The 5-(2-propynyloxy)m-dioxanes and 5-allyloxy-m-dioxanes of the class illustrated herein also possess insecticidal properties and are useful for the control of unwanted aquatic animal life. For example, 5-allyloxy-2-methyl-m-dioxane is effective against aquatic arthropods in concentrations as low as one part per million.

All of the dioxanes and dioxolanes of the present case are polymerizable by opening of the ring structure in the presence of Friedel-Craft catalysts to make moldable solid polymers whose characteristics can be modified by reaction of the unsaturated groups present.

We claim.

1. A compound of the formula

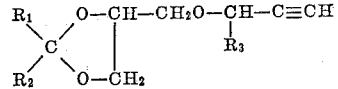

wherein $R_1$, $R_2$, and $R_3$ are selected from the group consisting of hydrogen and lower alkyl.

2. 2,2-dimethyl-4-(2-propynyloxymethyl) - 1,3-dioxolane.

3. 2-methyl-4-(2-propynyloxymethyl)-1,3-dioxolane.

References Cited

Cymerman-Craig et al.: Journal of Organic Chemistry, vol. 30, No. 12 (1965), pp. 4168–75.

Conningham et al.: Journal Chemical Society (London), 1965, pp. 2968–75.

ALEX MAZEL, *Primary Examiner.*

J. H. TURNIPSEED, *Assistant Examiner.*

UNITED STATES PATENT OFFICE
CERTIFICATE OF CORRECTION

Patent No. 3,376,315                                        April 2, 1968

Joanne Denise Burger et al.

It is hereby certified that error appears in the above numbered patent requiring correction and that the said Letters Patent should read as corrected below.

Column 1, lines 24 to 32, the formula should appear as shown below:

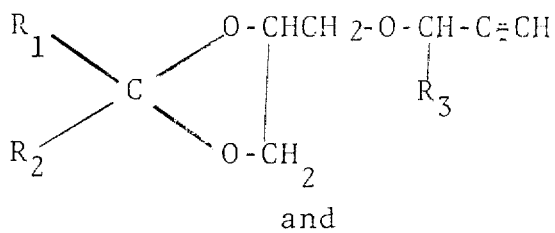

and

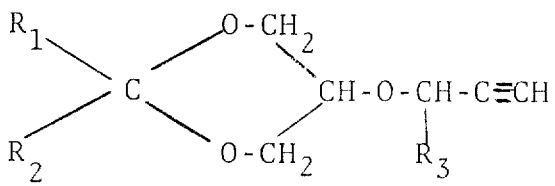

same Column 1, lines 34 to 40, the formula should appear as shown below:

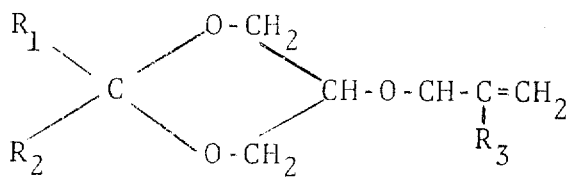

same column 1, line 42, "1, 2, and 3" should read -- (1), (2), and (3) --; line 50, "lanic" should read -- lane-4-methanol --; same line 50, "4-m-dioxanol" should read -- 5-m-dioxanol --; line 59, "ether" should read -- ethers --; same column 1, lines 61 to 66, the first formula should appear as shown below:

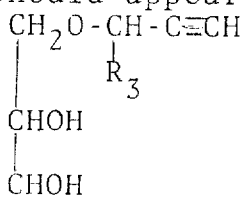

Signed and sealed this 12th day of August 1969.

(SEAL)
Attest:

EDWARD M. FLETCHER, JR.                           WILLIAM E. SCHUYLER, JR.
Attesting Officer                                          Commissioner of Patents